(12) United States Patent
Kim et al.

(10) Patent No.: US 11,729,283 B2
(45) Date of Patent: Aug. 15, 2023

(54) APPARATUS FOR ANALYSING ONLINE USER BEHAVIOR AND METHOD FOR THE SAME

(71) Applicant: NAVER Corporation, Seongnam-si (KR)

(72) Inventors: Youngjin Kim, Seongnam-si (KR); Moweon Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 231 days.

(21) Appl. No.: 16/502,653

(22) Filed: Jul. 3, 2019

(65) Prior Publication Data
US 2020/0014768 A1   Jan. 9, 2020

(30) Foreign Application Priority Data

Jul. 3, 2018   (KR) .......................... 10-2018-0077339

(51) Int. Cl.
| | |
|---|---|
| H04L 67/50 | (2022.01) |
| G06F 16/9535 | (2019.01) |
| H04L 67/146 | (2022.01) |
| G06Q 30/0601 | (2023.01) |
| G06F 16/955 | (2019.01) |
| G06F 21/31 | (2013.01) |

(52) U.S. Cl.
CPC .......... *H04L 67/535* (2022.05); *G06F 16/955* (2019.01); *G06F 16/9535* (2019.01); *G06Q 30/0631* (2013.01); *H04L 67/146* (2013.01); *G06F 21/316* (2013.01)

(58) Field of Classification Search
CPC ..... H04L 67/22; H04L 67/146; G06F 16/955; G06F 16/9535; G06Q 30/0631

USPC ......................................................... 709/224
See application file for complete search history.

(56) References Cited

U.S. PATENT DOCUMENTS

| | | | | |
|---|---|---|---|---|
| 6,477,575 B1 * | 11/2002 | Koeppel | ................ | G06Q 30/02 |
| | | | | 709/224 |
| 7,219,072 B1 * | 5/2007 | Sundaresan | ............ | G06Q 10/10 |
| | | | | 705/26.42 |

(Continued)

FOREIGN PATENT DOCUMENTS

| KR | 101713907 B1 | 3/2017 |
|---|---|---|
| KR | 101767454 B1 | 8/2017 |

OTHER PUBLICATIONS

Office action issued in corresponding Korean application No. 10-2018-0077339, dated Dec. 5, 2019.

(Continued)

*Primary Examiner* — Madhu Woolcock
(74) *Attorney, Agent, or Firm* — Greer Burns & Crain Ltd.

(57) ABSTRACT

Method and apparatus for analyzing an online behavior of a user accessing a web server include: collecting, when a user terminal accesses a web server and forms a session, log data corresponding to a behavior performed by the user terminal in the session in real time; detecting log data corresponding to a trigger log among the log data; extracting, when the trigger log is detected, log data cumulated up to a detection time point of the trigger log from a start time point of the session and generating cumulative log data; and performing pattern analysis on the cumulative log data and generating behavior information corresponding to the behavior of the user terminal.

11 Claims, 7 Drawing Sheets

(56) References Cited

U.S. PATENT DOCUMENTS

| | | | | |
|---|---|---|---|---|
| 7,809,752 | B1* | 10/2010 | Kozyrczak | G06F 16/95 707/790 |
| 7,904,524 | B2* | 3/2011 | Wehner | G06F 16/337 709/206 |
| 8,341,744 | B1* | 12/2012 | Obrecht | H04L 63/1416 713/188 |
| 8,832,265 | B2* | 9/2014 | Kozine | G06F 11/3447 709/224 |
| 9,805,101 | B2* | 10/2017 | Singh | G06F 16/2465 |
| 10,134,044 | B1* | 11/2018 | Shoemaker | G06Q 30/02 |
| 10,237,298 | B1* | 3/2019 | Nguyen | H04L 63/1408 |
| 10,326,789 | B1* | 6/2019 | Vines | H04L 67/02 |
| 10,503,964 | B1* | 12/2019 | Valgardsson | G06T 19/006 |
| 10,587,707 | B2* | 3/2020 | Qu | H04L 43/04 |
| 11,138,631 | B1* | 10/2021 | Perevodchikov | G06N 20/20 |
| 2002/0038365 | A1* | 3/2002 | Yeh | G06F 16/9535 709/224 |
| 2002/0083179 | A1* | 6/2002 | Shaw | G06F 16/9574 709/227 |
| 2005/0188423 | A1* | 8/2005 | Motsinger | G06F 11/3438 714/E11.195 |
| 2005/0246434 | A1* | 11/2005 | Bantz | H04Q 3/0029 709/223 |
| 2007/0186004 | A1* | 8/2007 | Ho | H04L 65/765 709/231 |
| 2008/0086558 | A1* | 4/2008 | Bahadori | G06F 11/3495 709/224 |
| 2010/0125505 | A1* | 5/2010 | Puttaswamy | G06Q 30/02 705/14.67 |
| 2010/0299292 | A1* | 11/2010 | Collazo | G06F 21/577 706/14 |
| 2011/0054920 | A1* | 3/2011 | Phillips | G06Q 30/02 705/1.1 |
| 2012/0158886 | A1* | 6/2012 | O'Connell | H04L 47/762 709/217 |
| 2012/0296745 | A1* | 11/2012 | Harper | G06Q 30/02 705/14.64 |
| 2012/0297484 | A1* | 11/2012 | Srivastava | G06F 21/552 726/23 |
| 2012/0317281 | A1* | 12/2012 | Fefelov | G06F 16/958 709/224 |
| 2013/0173573 | A1* | 7/2013 | Song | G06F 16/951 707/706 |
| 2014/0229363 | A1* | 8/2014 | Orloff | G06Q 40/025 705/38 |
| 2015/0039513 | A1* | 2/2015 | Adjaoute | G06Q 20/12 705/44 |
| 2015/0067531 | A1* | 3/2015 | Adi | G06Q 30/0621 715/745 |
| 2015/0082430 | A1* | 3/2015 | Sridhara | G06F 21/552 726/23 |
| 2015/0281986 | A1* | 10/2015 | Onishi | H04W 16/32 370/252 |
| 2016/0005029 | A1* | 1/2016 | Ivey | G06Q 20/409 705/44 |
| 2016/0092914 | A1* | 3/2016 | Wiener | G06Q 30/0246 705/14.45 |
| 2016/0110528 | A1* | 4/2016 | Gupta | G06F 21/577 726/19 |
| 2016/0171539 | A1* | 6/2016 | Ganduri | G06Q 30/0255 705/14.53 |
| 2016/0197948 | A1* | 7/2016 | Im | H04L 63/1425 726/23 |
| 2016/0212231 | A1* | 7/2016 | Martha | G06Q 30/02 |
| 2016/0246885 | A1* | 8/2016 | Aravamudhan | G06F 16/9535 |
| 2016/0247165 | A1* | 8/2016 | Ryabchun | G06Q 30/016 |
| 2016/0323399 | A1* | 11/2016 | Katsev | G06F 11/30 |
| 2016/0364736 | A1* | 12/2016 | Maugans, III | G06F 21/316 |
| 2017/0032248 | A1* | 2/2017 | Dotan-Cohen | H04L 67/52 |
| 2017/0201542 | A1* | 7/2017 | Kim | H04L 63/1425 |
| 2018/0018456 | A1* | 1/2018 | Chen | G06F 21/552 |
| 2018/0211267 | A1* | 7/2018 | Gerard | G06Q 30/0205 |
| 2019/0036858 | A1* | 1/2019 | Kovega | G06F 16/9566 |
| 2019/0281122 | A1* | 9/2019 | Sawabe | H04L 67/146 |
| 2020/0089179 | A1* | 3/2020 | Sato | G05B 19/048 |

OTHER PUBLICATIONS

Geonlyang Kim; "Implementation of a Product Recommender Based on Web Log Analysis"; Dept. of Computer Science and Statistics—Graduate School Chonnam National University; Feb. 2001 (English Absliact).

* cited by examiner

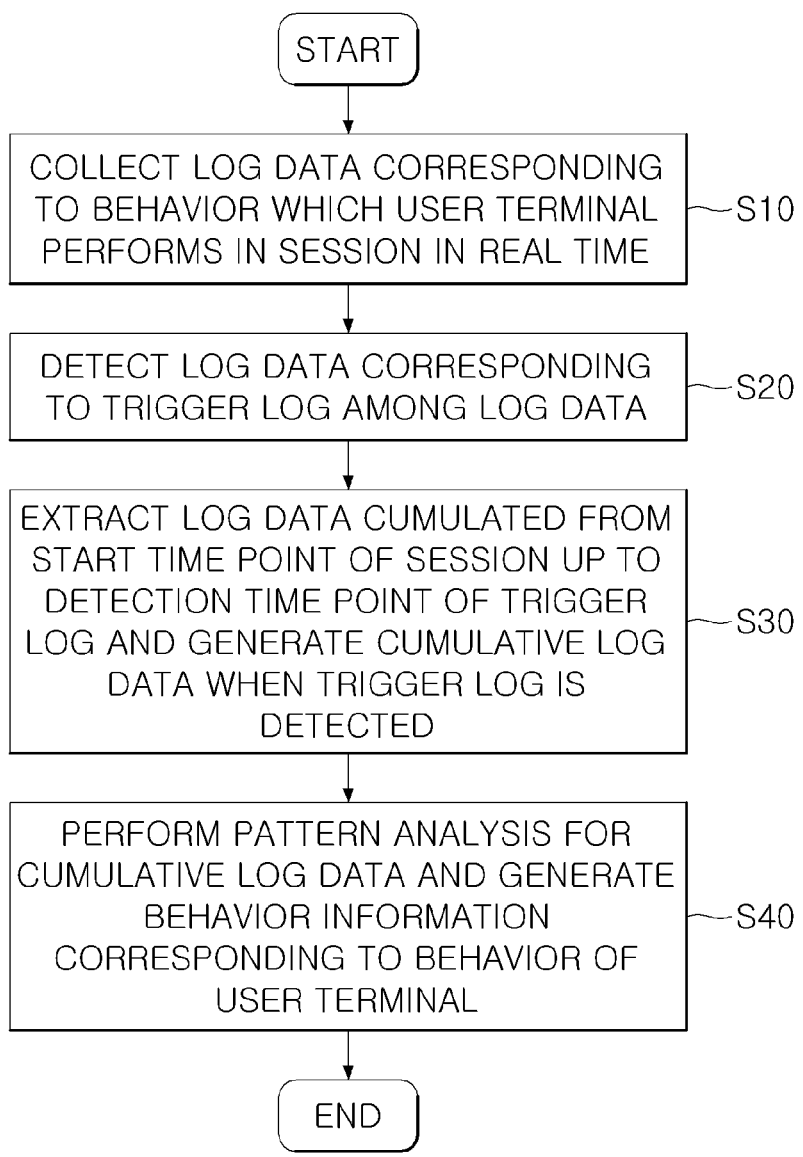

APPARATUS FOR ANALYSING ONLINE USER BEHAVIOR AND METHOD FOR THE SAME

CROSS-REFERENCE TO RELATED APPLICATIONS

This application claims priority to Korean Patent Application No. 10-2018-0077339 filed on Jul. 3, 2018 in Korean Intellectual Property Office, the entire contents of which is hereby incorporated by reference in its entirety.

BACKGROUND OF THE INVENTION

Field of Invention

The present invention relates to an apparatus for analyzing an user behavior and a method for the same, and more particularly, for analyzing an online behavior of a user accessing a web server in real time.

Background of Invention

Internet service providers providing Internet services using a web server, etc., can use log data to manage the web servers thereof more efficiently. Here, the log data is recorded every time a user accesses a web page, and the log data may include various information including an IP address, a requested file, an access time, etc., of the user.

The log data are used to discover meaningful usage patterns, profiles, trends, and the like of the users and in the related art, usage patterns (the number of accessors per time zone, the number of accessors for each page, etc.) of users, a trend, and the like for the use for system management, marketing, etc., are analyzed by using the log data.

However, in the related art, since only statistical numerical values for using the web server of the user are provided using the log data, a model may not be provided, which can analyze a specific behavior performed on the web server by the user or determine a concern of the user through online behavior analysis of the user.

BRIEF SUMMARY OF THE INVENTION

The present invention has been made in an effort to provide an apparatus for analyzing a user behavior and a method for the same, which may analyze a behavior of a user accessing a web server in real time.

The present invention has also been made in an effort to provide an apparatus for analyzing a user behavior and a method for the same, which may detect a specific pattern of the user by analyzing the behavior of the user accessing the web server in real time and distinguish the behavior of the user by the unit of data for analyzing the behavior of the user.

The present invention has also been made in an effort to provide an apparatus for analyzing a user behavior and a method for the same, which may detect an abnormal behavior of the user by analyzing the behavior of the user accessing the web server in real time.

The present invention has also been made in an effort to provide an apparatus for analyzing a user behavior and a method for the same, which may perform a user-customized product recommendation by analyzing the behavior of the user accessing the web server in real time.

An exemplary embodiment of the present invention provides a method for analyzing an online behavior of a user which includes: collecting, when a user terminal accesses a web server and forms a session, log data corresponding to a behavior performed by the user terminal in the session in real time; detecting log data corresponding to a trigger log among the log data; extracting, when the trigger log is detected, log data cumulated up to a detection time point of the trigger log from a start time point of the session and generating cumulative log data; and performing pattern analysis on the cumulative log data and generating behavior information corresponding to the behavior of the user terminal.

Another exemplary embodiment of the present invention provides an apparatus for analyzing a behavior of a user which includes: a log collection unit collecting, when a user terminal accesses a web server and forms a session, log data corresponding to a behavior performed by the user terminal in the session in real time; a trigger log detection unit detecting log data corresponding to a trigger log among the log data; a cumulative log data generation unit extracting, when the trigger log is detected, log data cumulated up to a detection time point of the trigger log from a start time point of the session and generating cumulative log data; and an analysis unit performing pattern analysis on the cumulative log data and generating behavior information corresponding to the behavior of the user terminal.

Yet another exemplary embodiment of the present invention provides an apparatus analyzing a behavior of a user which includes: a processor; and a memory coupled to the processor, in which the memory includes one or more modules configured to be executed by the processor, and the one or more modules may include command of collecting, when a user terminal accesses a web server and forms a session, log data corresponding to a behavior performed by the user terminal in the session in real time, detecting log data corresponding to a trigger log among the log data, extracting, when the trigger log is detected, log data cumulated up to a detection time point of the trigger log from a start time point of the session and generating cumulative log data, and performing pattern analysis on the cumulative log data and generating behavior information corresponding to the behavior of the user terminal.

Various features of the present invention and advantages and effects thereof will be more fully understood with reference to the following specific exemplary embodiments.

According to an exemplary embodiment of the present invention, by an apparatus for analyzing a user behavior and a method for the same, a behavior of a user accessing a web server can be analyzed in real time.

According to an exemplary embodiment of the present invention, by an apparatus for analyzing a user behavior and a method for the same, only when specific log data among log data input in real time is included, the behavior of the user is analyzed, thereby efficiently analyzing a user behavior.

According to an exemplary embodiment of the present invention, by an apparatus for analyzing a user behavior and a method for the same, since log data corresponding to the behavior of the user is analyzed in time series, a behavior which the user performs on a web server can be specifically determined.

According to an exemplary embodiment of the present invention, by an apparatus for analyzing a user behavior and a method for the same, it is possible to rapidly and accurately detect an abnormal online behavior or activities which the user performs with respect to the web server through analysis of the user behavior. Further, since a user who performs a specific online behavior may be detected through the analysis of the user behavior or a user-customized product recommendation may be performed, the detection of the user or the user-customized product recommendation are used for various fields.

However, advantages which can be obtained by the apparatus for analyzing a online user behavior or activities and the method for the same according to the exemplary embodiments of the present invention are not limited to the aforementioned advantages and other unmentioned advantages will be clearly understood by those skilled in the art from the following description.

BRIEF DESCRIPTION OF THE DRAWINGS

FIG. 6 is a flowchart illustrating a method for analyzing an online behavior of a user according to an exemplary embodiment of the present invention.

DETAILED DESCRIPTION OF THE OF THE INVENTION

Figure 1:
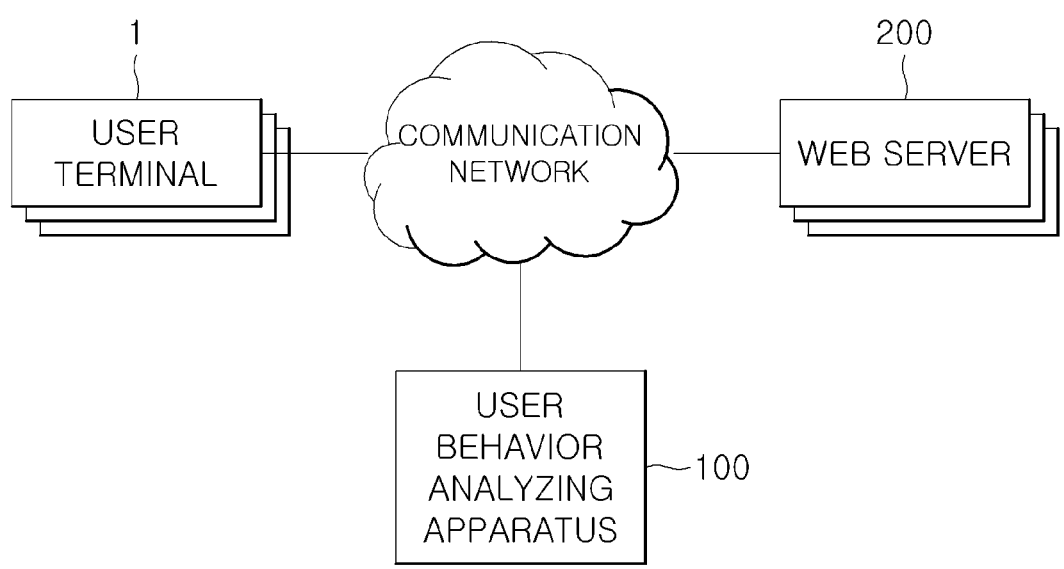
FIG. 1 is a schematic view illustrating a system for analyzing an online behavior of a user according to an exemplary embodiment of the present invention.

Hereinafter, exemplary embodiments disclosed in this specification will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the specification only and do not have their own distinguished meanings or roles. Further, the term "unit" used in the present invention means software and hardware components such as FPGA or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" may be combined into a smaller number of components and "units" or further separated into additional components and "units".

In describing the exemplary embodiment of this specification, a detailed description of related known technologies will be omitted if it is determined that the detailed description makes the gist of the exemplary embodiment disclosed in this specification unclear. Further, it is to be understood that the accompanying drawings are used for easily understanding the exemplary embodiments disclosed in this specification and a technical spirit disclosed in this specification is not limited by the accompanying drawings and all changes, equivalents, or substitutes included in the spirit and the technical scope of the present invention are included.

FIG. 1 is a schematic view illustrating a system for analyzing an online behavior or activities of a user according to an exemplary embodiment of the present invention.

Referring to FIG. 1, the system for analyzing an online behavior of a user according to an exemplary embodiment of the present invention may include a user terminal 1, a user behavior analyzing apparatus 100, and a web server 200.

The user terminal 1 may be a terminal device used by the user and the user terminal 1 may communicate with the web server 200 using a wired or wireless communication network. Here, the user terminal 1 may be replaced with terms including a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a station (STA), or the like.

The user terminal 1 may perform voice or data communication through the wired or wireless communication network and the user terminal 1 may include a browser for transmitting and receiving information, a memory for storing a program and a protocol, a microprocessor for computing and controlling by executing various programs, etc.

The user terminal 1 according to an exemplary embodiment of the present invention may be implemented in various forms. For example, the user terminal 1 may be a mobile device to which wireless communication technology is applied, a smart phone, a tablet PC, a personal digital assistants (PDA), a portable multimedia player (PMP), an MP3 player, a wearable device (for example, a smartwatch, a smart glass, and a head mounted display (HMD)), etc., or a digital device which is difficult to carry, such as a PC, an IPTV, a smart TV, etc.

The web server 200 may provide a service used by the user through the user terminal 1. That is, the web server 200 may provide the service to the user through a network and receive a service packet requested from the user terminal 1 or transmit a response packet to the user terminal 1.

The web server 200 may be a web application server (WAS), an Internet information server (IIS), or a known web server or cache server on the Internet using ApacheTomcat or Nginx. Further, the web server 200 may support an operating system (OS) such as Linux or Windows, and execute a received control command. In software, the web server 200 may include a program module implemented through a language such as C, C++, Java, Visual Basic, Visual C, or the like.

The web server 200 may be a server for an Internet portal service, and may be a server for providing online transactions of insurance and financial service providers, and a service providing server connected to a home trading system (HTS) or mobile trading system (MTS) server for trading securities. However, a service providing field is not limited to electronic commerce and may also include contents providing services such as games, music, videos, and the like using an online server and is not limited.

The user behavior analyzing apparatus 100 may collect log information for behaviors or operations which the user terminal 1 accessing the web server 200 performs during an access and analyze the online behavior of the user by using the collected log information of the user terminal 1. That is, the user behavior analyzing apparatus 100 analyzes the online behavior of the user to detect an abnormal online behavior of the user terminal 1 and according to the exemplary embodiment, the user behavior analyzing apparatus 100 may determine a tendency or a taste of the user.

In the related art, after a session of the user is completed, the user terminal 1 detects the abnormal online behavior of the user by collecting the log information performed during the session by the user terminal 1, but by the user behavior analyzing apparatus 100 according to an exemplary embodiment of the present invention, it is possible to analyze the behavior of the user in real time during a progress of the session. That is, when the abnormal behavior of the user is detected in real time, it is possible to rapidly cope with the abnormal behavior of the user.

In FIG. 1, it is illustrated that the user behavior analyzing apparatus 100 is connected to the web server 200 through the Internet, but according to the exemplary embodiment, the user behavior analyzing apparatus 100 may be directly connected to the web server 200 or may be included as one component within the web server 200.

Figure 2:
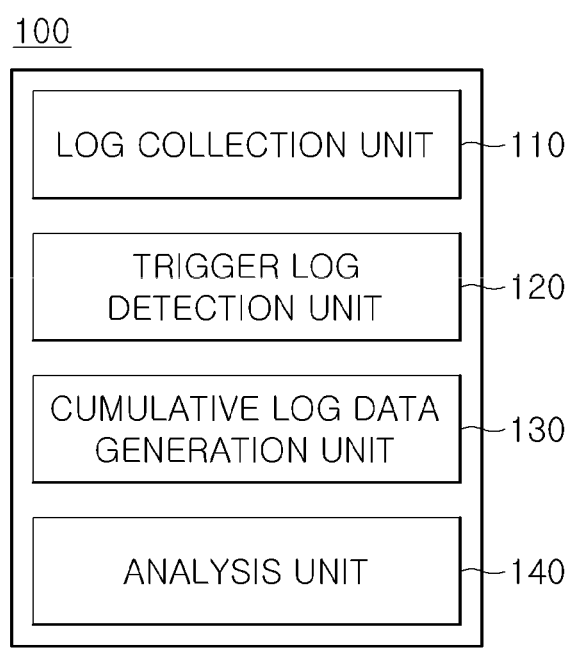
FIGS. 2 and 3 are block diagrams illustrating an apparatus for analyzing a an online behavior of a user according to an exemplary embodiment of the present invention.

FIG. 2 is a block diagram illustrating the user behavior analyzing apparatus 100 for analyzing an online behavior of a user according to an exemplary embodiment of the present invention.

Referring to FIG. 2, the user behavior analyzing apparatus 100 for analyzing a online behavior of a user according to an exemplary embodiment of the present invention includes a log collection unit 110, a trigger log detection unit 120, a cumulative log data generation unit 130, and an analysis unit 140.

When the user terminal 1 accesses the web server 200 and forms the session, the log collection unit 110 may collect log data corresponding to a behavior or operations performed by the user terminal 1 in the session in real time.

The web server 200 may generate the log data corresponding to the behavior performed by the user terminal 1 and the log collection unit 110 may receive the log data from the web server 200 in real time. The log collection unit 110 may collect the log data while the user terminal 1 accesses the web server 200 and maintains the session.

The log data collected by the log collection unit 110 may include all the packet information transmitted and received between the user terminal 1 and the web server 200, unique information (transaction number, transaction number, service registration number, etc.) for a service received by the user, environmental information (hardware information such as an M/B ID, a CPU ID, an HDD S/N, and a USB S/N, software information such as a version of the OS, a version of patch/plugging of a used browser or peripheral devices, and a version/type/language of the browser, network information such as an IP address, an MAC address, a G/W IP address, and a G/W MAC address, USIM information, etc.) for the user terminal 1, peripheral hardware information (information on BLE products including a keyboard, a mouse, a USB storage, a touch pad, a mobile keyboard, a mouse, and the like) of the user terminal 1, input information using the hardware, software information (an operating process, specific resist information etc.) installed and executed in the user terminal 1, etc.

Figure 4A:
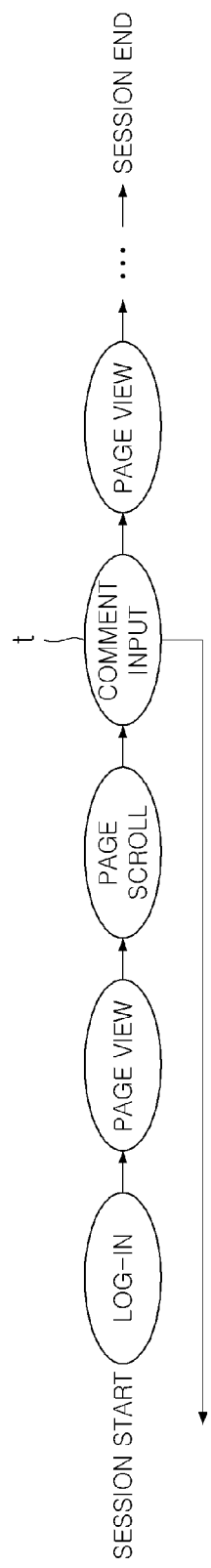
FIGS. 4A and 4B are schematic views illustrating detection of an abnormal behavior of an apparatus for analyzing an online behavior of a user according to an exemplary embodiment of the present invention.

According to the exemplary embodiment, a Uniform Resource Locator (URL) address and a page identifier (ID) of a web page accessed by the user terminal 1 in the web server 200, an input type and an input coordinate of an input provided in the web page by the user terminal 1, and log-in and log-out information of the user terminal 1 may be included in the log data. Specifically, as illustrated in FIG. 4A, the log collection unit 110 may collect log data such as log-in, page views, page scrolls, comment inputs, and page views from the web server 200.

The trigger log detection unit 120 may detect log data corresponding to a trigger log among the log data. Here, the trigger log may be set in advance and the trigger log detection unit 120 may detect log data corresponding to the trigger log among the log data collected in real time.

The trigger log which is for setting a time for analyzing the online behavior of the user terminal 1 may analyze the behavior or operations performed by the user terminal 1 in the session based on a time point at which the trigger log is detected.

Here, the trigger log may be variously set according to the exemplary embodiment and an upload log corresponding to a behavior of uploading contents such as a comment to the web server 200 by the user terminal 1, a preference log corresponding to a behavior of inputting a preference such as upvote or downvote for contents provided by the web server 200 by the user terminal 1, a shopping access log corresponding to a behavior of accessing a shopping web page provided by the web server 200 by the user terminal 1, a settlement log corresponding to a cost settlement performed by the user terminal 1, and the like may be set as the trigger log.

For example, the user terminal 1 may input the comment or the upvote and the downvote into the web server 200 using an illegal program such as a macro, etc. In order to detect such a case, the user terminal 1 may set the upload log for uploading the contents such as the comment to the web server 200, the preference log for inputting the preference such as the upvote and the downvote to the web server 200, etc., as the trigger log.

An exemplary embodiment is available, in which the shopping access log of accessing the shopping web page by the user terminal 1 is set as the trigger log in order to determine the taste or tendency of the user and perform product recommendation corresponding thereto.

When the trigger log is detected, the cumulative log data generation unit 130 extracts log data cumulated up to a detection time point of the trigger log from a start time point of the session to generate cumulative log data. That is, the behavior or the operation of the user terminal 1 at the time of detecting the trigger log may be analyzed in order to maintain a real-time property of the online user behavior analysis. To this end, the cumulative log data generation unit 130 collects the log data cumulated from the start time point of the session to the detection time point of the trigger log to generate the cumulative log data. In this case, the cumulative log data generation unit 130 collects the cumulated log data at the detection time point of the trigger log in real time to generate the cumulative log data.

In the related art, the online behavior of the user is analyzed after the session is terminated, but when the session becomes longer, it is difficult to secure the real-time property for the online user behavior analysis. That is, even when the user terminal 1 performs the abnormal online behavior, i.e., corresponding to the user inputs to the user terminal 1, by accessing the web server 200, since the abnormal behavior may be sensed after the session is already terminated, it is difficult to immediately cope with the abnormal online behavior of the user. According to the exemplary embodiment, the behavior of the user is analyzed at a predetermined time interval after the user accesses the session, thereby securing the real-time property. For example, the behavior of the user may be analyzed every 10 seconds after the session starts. However, in this case, in order to determine a behavior pattern of the user included in the entire session, an inspection range is gradually increased from 0 to 10 seconds, 0 to 20 seconds, 0 to 30 seconds, etc., and there is a disadvantage in that the behavior of the user needs to be analyzed at a predetermined time interval even when the user does not perform a particular behavior.

On the other hand, the cumulative log data generation unit 130 may limit the inspection range to the log data cumulated from the start time point of the session to the detection time of the trigger log and only when the user performs a specific online behavior using the trigger log, the behavior is analyzed, and as a result, it is possible to efficiently analyze the online behavior of the user while maintaining the real-time property.

According to the exemplary embodiment, a plurality of trigger logs may be included in one session. In this case, the cumulative log data generation unit 130 may individually generate cumulative log data corresponding to the respective trigger logs. That is, the log data cumulated from the start time point of the session up to the detection time point of each trigger log are individually extracted to generate the cumulative log data. For example, the cumulative log data from the start time point of the session up to a detection time point of a first trigger log may be generated and when a second trigger log is then detected, the cumulative log data from the start time point of the session up to a detection time point of a second trigger log may be again generated and provided to the analysis unit 140.

The analysis unit 140 may perform pattern analysis on the cumulative log data to generate behavior information corresponding to the behavior of the user terminal 1. The analysis unit 140 may perform the pattern analysis in real time when the cumulative log data is generated.

Here, the analysis unit 140 compares the cumulative log data with an abnormal operation pattern to discriminate whether the user terminal 1 performs the abnormal behavior in the session. Since the abnormal operation pattern corresponds to a time-series set of log data corresponding to a specific abnormal behavior, the abnormal online operation of the user terminal 1 may be discriminated by comparing the cumulative log data of the user terminal 1 with the abnormal operation pattern.

Specifically, the analysis unit 140 may compare the cumulative log data with a plurality of abnormal operation patterns corresponding to respective abnormal behaviors in real time. Since respective corresponding abnormal behaviors are set in the plurality of abnormal operation patterns, when the cumulative log data corresponds to any one of the plurality of abnormal operation patterns, it may be discriminated that the user terminal 1 performs abnormal behavior information corresponding to the abnormal operation pattern. According to the exemplary embodiment, it may be verified that the behavior in the session of the user terminal 1 corresponds to a normal behavior by using a normal operation pattern.

Additionally, an exemplary embodiment is also available in which the analysis unit 140 discriminates whether the user terminal 1 performs the abnormal behavior by applying the cumulative log data to a predetermined abnormal behavior discrimination model. Here, the abnormal behavior discrimination model may be formed by learning a plurality of log data samples corresponding to the abnormal operation pattern or the normal operation pattern through machine learning, or the like. Accordingly, when the analysis unit 140 inputs the cumulative log data into the abnormal behavior discrimination model, the cumulative log data may be provided by discriminating whether the cumulative log data corresponds to the normal behavior or the abnormal behavior in the abnormal behavior discrimination model.

Thereafter, when it is discriminated that the user terminal 1 performs the abnormal online behavior, the analysis unit 140 may generate the online behavior information including the abnormal behavior information corresponding to the abnormal online behavior of the user terminal 1.

The log collection unit 110, the trigger log detection unit 120, the cumulative log data generation unit 130, and the analysis unit 140 of the user behavior analyzing apparatus may be implemented as software components, object oriented software components, class components, and task components, processes, functions, attributes, procedures, subroutines, segments of a program code, drivers, firmware, microcode, circuitry, data, databases, data structures, tables, arrays, and variables. Functions provided in the components may be combined into a smaller number of components or further separated into additional components.

Referring to FIG. 4A, the user terminal 1 may sequentially perform the log-in, the page view, the page scroll, comment input, the page view, etc., and terminate the session after starting the session. Herein, the log data may be generated to correspond to the behaviors or operations such as the log-in, the page view, the page scroll, the comment input, and the page view. On the other hand, as illustrated in FIG. 4A, a comment input t may be set as the trigger log. For example, there may be a case where the user terminal 1 inputs the comment into the web server 200 by an illegal method using the macro, or the like and the user behavior analyzing apparatus 100 may set the comment input t performed by the user as the trigger log in order to verify the case.

Thereafter, the log data accumulated from the start time point of the session to the detection time point of the trigger log is checked to check whether the user terminal 1 performs the abnormal behavior of inputting the comment by the illegal method such as the macro, etc.

Figure 4B:
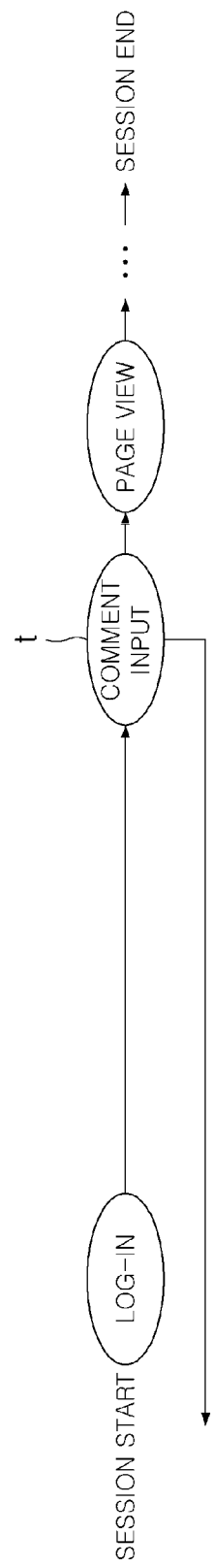

That is, when the user inputs the comment according to an intention thereof instead of the operation by the macro, the user terminal 1 may verify contents of the web page, such as an article after the log-in and then, scroll a page and input the comment as illustrated in FIG. 4A. On the contrary, when the macro, etc., is used, as illustrated in FIG. 4B, article contents are verified after the log-in and the user terminal 1 may move to the comment input immediately after the log-in without a process such as scrolling the page and moving to a comment input window. Accordingly, when a pattern of log data illustrated in FIG. 4B is provided, the case may be discriminated as not inputting of the comment by a person but preparation of the comment by the macro and behavior information corresponding thereto may be generated. That is, the pattern of the log data corresponding to FIG. 4B may be set as the abnormal operation pattern.

According to another exemplary embodiment, the analysis unit 140 may analyze the user online behavior in real time to perform the shopping product recommendation. That is, when the shopping access log of accessing the shopping web page by the user terminal 1 is included in the cumulative log data, the analysis unit 140 may further encapsulate product recommendation information in the behavior information. Specifically, the analysis unit 140 may extract, from the cumulative log data, a search log performed by the user terminal 1 before the shopping access log. Thereafter, the analysis unit 140 may extract information on products searched by the user with an interest using the search log and generate recommendation product information corresponding to the search log of the user based on the extracted information. The generated recommendation product information may be included in the behavior information.

Figure 5:
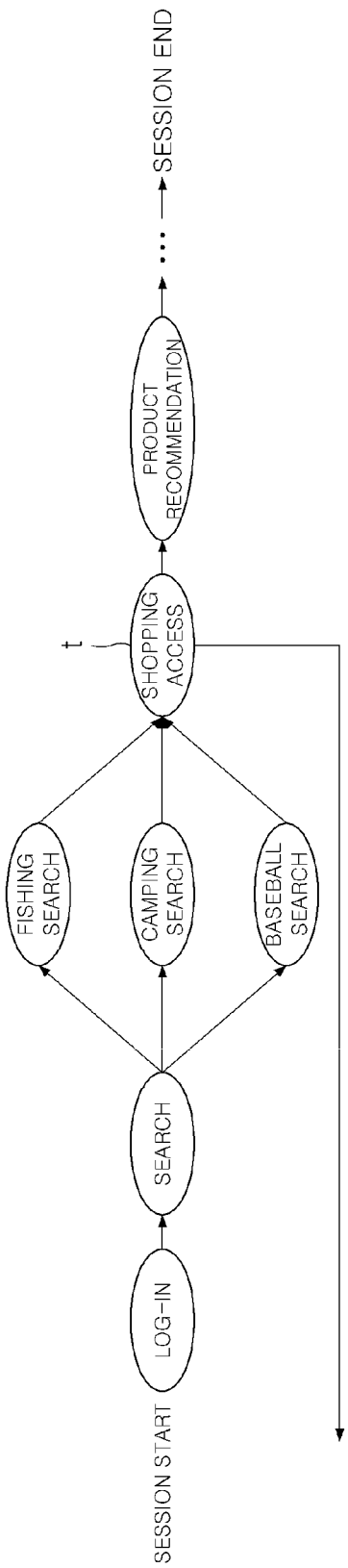
FIG. 5 is a schematic view illustrating product recommendation of an apparatus for analyzing an online behavior of a user according to an exemplary embodiment of the present invention.

Referring to FIG. 5, when the session starts, the user terminal 1 may log into the web server 200 and perform a search for fishing, camping, baseball, and the like. Then, the user terminal 1 may access the shopping web page provided by the web server 200. In this case, since the shopping access t corresponds to the trigger log, The cumulative log data from the start time point of the session up to a detection time point of the shopping access t may be analyzed. In this case, since it may be regarded that the user visits the shopping web page in order to purchase products related to the fishing, camping, baseball, or the like searched by the user, the analysis unit 140 may generate product recommendation information for the products or services related to the fishing, camping, baseball, or the like searched by the user and provide the generated product recommendation information to the user terminal 1.

On the other hand, according to the exemplary embodiment, there may be a case where there is no search log performed before the shopping access log in the cumulative log data. That is, the user may access the shopping web page without performing the search for the product separately. In this case, since it is difficult to extract information on a product or service which the user intends to purchase only with the log data of a current session, the analysis unit 140 may utilize the log data included in the previous session of the user terminal 1. That is, the analysis unit 140 may search the log data included in the previous session by the user terminal 1, extract the search log performed by the user terminal 1, and generate the recommendation product information by utilizing the extracted search log.

Figure 3:
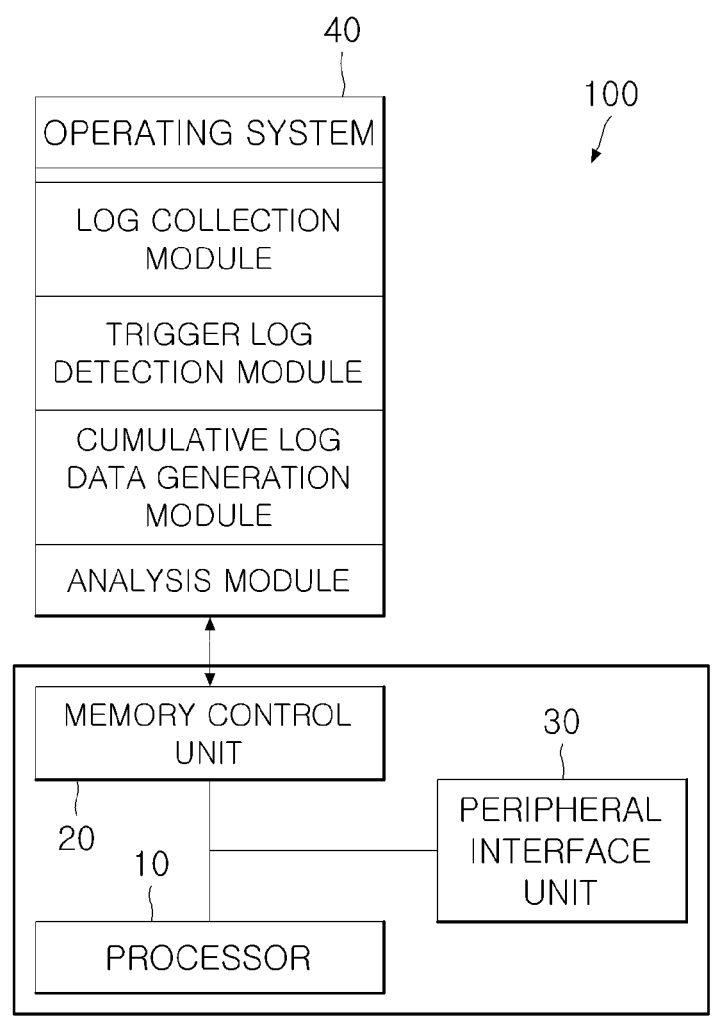

As illustrated in FIG. 3, the user behavior analyzing apparatus 100 according to an exemplary embodiment of the present invention includes physical components including a processor 10, a memory 40, and the like, and the memory 40 may include one or more modules configured to be executed by the processor 10. Specifically, the one or more modules may include a log collection module, a trigger log detection module, a cumulative log data generation module, and an analysis module.

The processor 10 may perform various functions and perform a function of processing data by executing various software programs and a set of commands stored in the memory 40. A peripheral interface unit 30 may connect the input and output peripheral devices of a computer device to the processor 10 and the memory 40, and a memory controller 20 may perform a function of controlling a memory access when the processor 10 or a component of the computer device accesses the memory 40. According to the exemplary embodiment, the processor 10, the memory controller 20, and the peripheral interface unit 30 may be implemented on a single chip or implemented as separate chips.

The memory 40 may include a high-speed random access memory, one or more magnetic disk storage devices, a non-volatile memory such as a flash memory device, and the like. Further, the memory 40 may include a storage device located away from the processor 10 or a network attached storage device accessed through a communication network such as the Internet.

As illustrated in FIG. 3, in the user behavior analyzing apparatus 100 according to an exemplary embodiment of the present invention, the memory 40 may include a log collection module, a trigger log detection module, a cumulative log data generation module, and an analysis module corresponding to application programs in addition to the operating system. Here, each of the modules as a set of commands for performing the aforementioned functions may be stored in the memory 40.

Accordingly, in the user behavior analyzing apparatus 100 according to an exemplary embodiment of the present invention, the processor 10 accesses the memory 40 to execute the commands corresponding to the respective modules. However, the log collection module, the trigger log detection module, the cumulative log data generation module, and the analysis module correspond to the log collection unit 110, the trigger log detection unit 120, the cumulative log data generation unit 130, and the analysis unit 140, respectively, so a detailed description thereof will be omitted here.

FIG. 6 is a flowchart illustrating a method for analyzing a behavior of a user according to an exemplary embodiment of the present invention.

Referring to FIG. 6, the method for analyzing a behavior of a user according to an exemplary embodiment of the present invention may include a log collecting step (S10), a trigger log detecting step (S20), a cumulative log data generating step (S30), and an analyzing step (S40). Here, the method for analyzing a behavior of a user according to an exemplary embodiment of the present invention is performed by the user behavior analyzing apparatus 100.

In the log collecting step (S10), when the user terminal 1 accesses the web server 200 and forms the session, log data corresponding to a behavior performed by the user terminal 1 in the session is collected by the log collection unit 110 in real time. That is, in the log collecting step (S10), the log data from a moment when the user terminal 1 accesses the web server 200 up to a moment when the user terminal leaves the web server may be collected in real time.

Here, the log data may be generated to correspond to the respective behaviors which the user terminal 1 performs on the web server 200 and according to the exemplary embodiment, a Uniform Resource Locator (URL) address and a page identifier (ID) of a web page accessed by the user terminal in the web server, an input type and an input coordinate of an input provided in the web page by the user terminal, and log-in and log-out information of the user terminal may be included in the log data.

In the trigger log detecting step (S20), log data corresponding to a trigger log among the log data is detected by the trigger log detection unit 120. Here, the trigger log may be set in advance, and in the trigger log detecting step (S20), log data corresponding to the trigger log among the log data collected in real time may be detected. The trigger log is for setting a time point for analyzing the behavior or operation which the user terminal 1 performs in the session and when the trigger log is detected, the online behavior which the user terminal performs in the session may be analyzed.

The trigger log may be variously set according to the exemplary embodiment and here, an upload log corresponding to a behavior of uploading contents such as a comment to the web server by the user terminal 1, a preference log corresponding to a behavior of inputting a preference such as upvote or downvote for contents provided by the web server 200 by the user terminal, a shopping access log corresponding to a behavior of accessing a shopping web page provided by the web server by the user terminal, a settlement log corresponding to a cost settlement performed by the user terminal, and the like may be set as the trigger log.

In the cumulative log data generating step (S30), when the trigger log is detected, log data cumulated up to a detection time point of the trigger log from a start time point of the session is extracted to generate cumulative log data by the cumulative log data generation unit 130. That is, in order to maintain the real-time property of the user behavior analysis, the behavior of the user terminal 1 at the time of detecting the trigger log may be analyzed and to this end, cumulative log data for log data up to the detection time point of the trigger log may be generated. In this case, the cumulative log data may be generated in real time at the time of detecting the trigger log.

According to an exemplary embodiment, a plurality of trigger logs may be included in one session. In this case, in the cumulative log data generating step (S30), cumulative log data corresponding to the respective trigger logs may be individually generated. That is, the log data cumulated from the start time point of the session up to the detection time when each trigger log is detected are individually extracted to generate the cumulative log data.

In the analyzing step (S40), pattern analysis on the cumulative log data is performed by the analysis unit 140 to generate behavior information corresponding to the behavior of the user terminal 1. Here, in the analyzing step (S40), the cumulative log data is compared with an abnormal operation pattern to determine whether the user terminal 1 performs the abnormal behavior in the session. Thereafter, when it is discriminated that the user terminal 1 has performed the abnormal behavior, the behavior information including the abnormal behavior information corresponding to the abnormal behavior of the user terminal may be generated.

Specifically, in the analyzing step (S40), the cumulative log data may be compared with a plurality of abnormal operation patterns corresponding to respective abnormal behaviors. Here, respective corresponding abnormal behaviors may be set in a plurality of abnormal operation patterns. Therefore, when the cumulative log data corresponds to one of the plurality of abnormal operation patterns, the abnormal behavior information corresponding to the corresponding abnormal operation pattern may be included in the behavior information of the user terminal 1.

According to one exemplary embodiment, in the analyzing step (S40), the user behavior may be analyzed in real time to perform a shopping product recommendation. That is, when the shopping access log of accessing the shopping web page by the user terminal 1 is included in the cumulative log data, the behavior information may further include product recommendation information. Specifically, a search log performed by the user terminal 1 before the shopping access log may be extracted from the cumulative log data. Thereafter, information on products searched by the user with an interest may be extracted using the search log and recommendation product information corresponding to the search log of the user may be generated based on the extracted information.

According to an exemplary embodiment, there may be a case where there is no search log performed before the shopping access log in the cumulative log data. That is, the user may access the shopping web page without performing a search for the product separately. In this case, since it is difficult to extract information on a product or service which the user intends to purchase only with the log data of a current session, the log data included in the previous session of the user terminal may be used in the analyzing step (S40). That is, the log data included in the previous session may be searched, the search log performed by the user terminal may be extracted, and the recommendation product information may be generated by utilizing the extracted search log.

The aforementioned present invention may be implemented as a computer readable code in a medium having a program recorded therein. The computer readable medium may continuously store or temporarily store a computer executable program for execution or downloading. Further, the medium may be a variety of recording means or storage means in the form of a combination of a single hardware or a plurality of hardware, and is not limited to a medium directly connected to a computer system, but may be dispersed on a network. Examples of the medium may include a magnetic medium such as a hard disk, a floppy disk and a magnetic tape, an optical recording medium such as CD-ROM and DVD, a magneto-optical medium such as a floptical disk, and a medium configured to store a program command, which includes a ROM, a RAM, flash memory, and the like. Further, examples of other media may include recording media or storage media managed by an app store distributing an application or sites, servers, and the like that supply or distribute various other software. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

The present invention is not limited by the aforementioned exemplary embodiments and the accompanying drawings. It will be apparent to those skilled in the art that various substitutions, modifications, and changes of components according to the present invention can be made within the scope without departing from the spirit of the present invention.

What is claimed is:

1. A method for analyzing online behavior of a user accessing a web server through a user terminal, the method comprising:
    collecting, every time the user terminal accesses the web server and forms a session having a start time, log data corresponding to behavior performed by the user terminal during progress of the session, the log data collected from the web server in real-time as the log data is generated by the web server;
    detecting two or more trigger logs within the log data collected from the web server, wherein each of the two or more trigger logs correspond to one or more specified user behaviors set in advance; and
    for each of the two or more trigger logs, at a time when the trigger log is detected:
        extracting, from the log data collected from the web server, an inspection range of the log data from the start time of the session to a detection time of the trigger log;
        generating cumulative log data from the start time to the detection time of the trigger log; and
        in response to the generating of the cumulative log data, performing pattern analysis in real-time on the generated cumulative log data, wherein the pattern analysis is performed during the session by comparing the generated cumulative log data with an abnormal operation pattern and determining if the user terminal is performing an abnormal behavior based on the pattern analysis,
    wherein the extracting, the generating and the performing pattern analysis are performed individually for each of the two or more trigger logs.

2. The method of claim 1, wherein the log data includes at least one of
- a uniform resource locator (URL) address and a page identifier (ID) of a web page which the user terminal accesses in the web server,
- an input type and an input coordinate of an input which the user terminal applies in the web page, and
- log-in information of the user terminal.

3. The method of claim 1, wherein each of the two or more trigger logs include at least any one of an upload log corresponding to a behavior of uploading contents to the web server by the user terminal, a preference log corresponding to a behavior of inputting a preference for contents provided by the web server by the user terminal, a shopping access log corresponding to a behavior of accessing a shopping web page provided by the web server by the user terminal, and a settlement log corresponding to a cost settlement performed by the user terminal.

4. The method of claim 1, wherein in the generating of the cumulative log data, when the two or more trigger logs are detected in one session, cumulative log data corresponding to respective trigger logs are individually generated.

5. The method of claim 4, wherein the log data cumulated from the start time point of the session up to a detection time point of a most recent trigger log among the two or more trigger logs becomes the cumulative log data.

6. The method of claim 1, further comprising:
- determining whether the user terminal performs an abnormal behavior in the session by comparing each of the cumulative log data with an abnormal operation pattern,
- wherein abnormal behavior information corresponding to the abnormal behavior performed by the user terminal is included in behavior information when the abnormal operation pattern corresponds to one of the cumulative log data.

7. The method of claim 1, wherein when a shopping access log of accessing a shopping web page by the user terminal is included in one of the cumulative log data, the behavior information further includes product recommendation information corresponding to the shopping access log.

8. The method of claim 7, wherein when a search log, performed by the user terminal before the shopping access log, is included in one of the cumulative log data, product recommendation information corresponding to the search log is included in the behavior information.

9. The method of claim 8, wherein when there is no search log performed before the shopping access log in one of the cumulative log data, a search log performed in a previous session by the user terminal is extracted to generate product recommendation information corresponding to the search log performed in the previous session.

10. A non-transitory computer readable recording medium storing a computer program for executing, by a processor, the method for analyzing the online behavior of the user of claim 1.

11. An apparatus for analyzing online behavior of a user accessing a web server through a user terminal, the apparatus comprising:
- a processor; and
- a memory coupled to the processor,
  wherein the memory includes one or more modules configured to instruct the processor to execute steps including:
- collecting, every time the user terminal accesses the web server and forms a session having a start time, log data corresponding to behavior performed by the user terminal during progress of the session, the log data collected from the web server in real-time as the log data is generated by the web server,
- detecting two or more trigger logs within the log data collected from the web server, wherein each of the two or more trigger logs correspond to one or more specified user behaviors set in advance; and
- for each of the two or more trigger logs, at a time when the trigger log is detected:
- extracting, from the log data collected from the web server, an inspection range of the log data from the start time of the session to a detection time of the trigger log;
- generating cumulative log data from the start time to the detection time of the trigger log, and
- in response to the generating of the cumulative loci data, performing pattern analysis in real-time on the generated cumulative log data, wherein the pattern analysis is performed during the session by comparing the generated cumulative log data with an abnormal operation pattern and determining if the user terminal is performing an abnormal behavior based on the pattern analysis,
- wherein the extracting, the generating and the performing pattern analysis are performed individually for each of the two or more trigger logs.

* * * * *